June 12, 1923.
F. DANIELS ET AL
1,458,525
PROCESS FOR FIXATION OF ATMOSPHERIC NITROGEN
Filed May 12, 1919     2 Sheets-Sheet 1
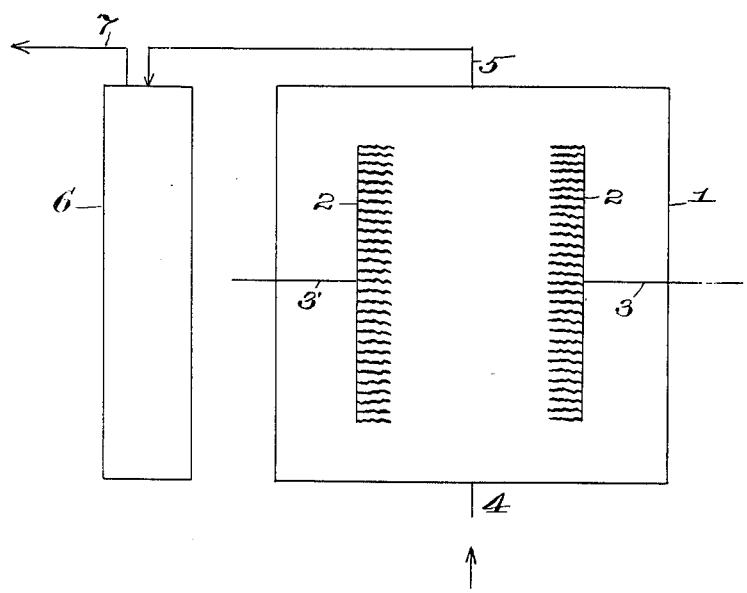
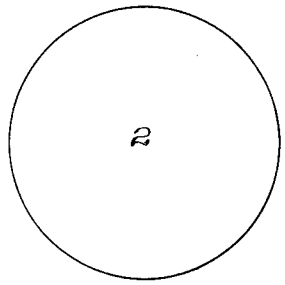
Farrington Daniels.
Oliver R. Wulf.
Inventors

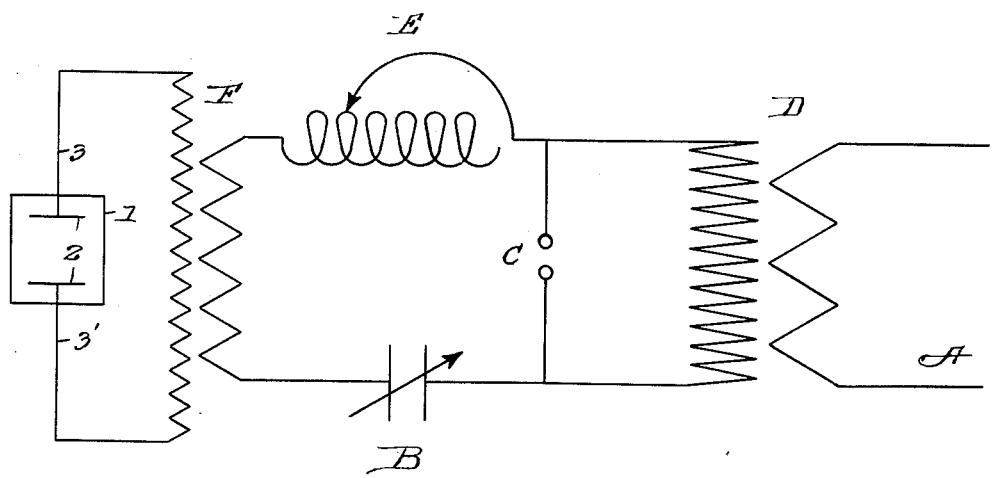

Patented June 12, 1923.

1,458,525

UNITED STATES PATENT OFFICE.

FARRINGTON DANIELS, OF EAST FALLS CHURCH, VIRGINIA, AND OLIVER R. WULF, OF NORWICH, CONNECTICUT.

PROCESS FOR FIXATION OF ATMOSPHERIC NITROGEN.

Application filed May 12, 1919. Serial No. 296,542.

*To all whom it may concern:*

Be it known that we, FARRINGTON DANIELS and OLIVER R. WULF, both citizens of the United States, residing at East Falls Church, county of Alexandria, and State of Virginia, and Norwich, county of New London, and State of Connecticut, respectively, have invented a new and useful Process for Fixation of Atmospheric Nitrogen, of which the following is a specification.

This invention relates to the manufacture of oxygen compounds of nitrogen and has for its objects the electrical production of such compounds by employing a streaming electric discharge.

Theoretically one kilowatt hour of electricity is capable of giving 1200 grams of nitric oxide NO, which when oxidized and absorbed in water yields 2520 grams of nitric acid.

The arc process for making nitric acid has not produced more than 60 or 70 grams of nitric acid per kilowatt hour and the theoretical limit is not much more than this because about 97 per cent of the electric energy is converted into heat energy in raising the gases to the temperature of the arc.

Various experimenters have observed that oxides of nitrogen are formed when nitrogen and oxygen are passed through ordinary ozonizers, but only in small amounts. High concentrations have been obtained after prolonged action of the silent electric discharge or corona, of uniform brightness throughout. For example, Ehrlich and Russ acted upon a closed volume of air of about 140 cc. in a Siemens ozonizer with a corona discharge and obtained four per cent of nitric oxide after 180 minutes. With excess of oxygen in the air the times were shorter and the concentrations higher. In all such experiments, where the discharge acts for a long time on a small volume of gas, the consumption of electrical energy is very high per gram of nitric acid produced.

Our investigations have led to the discovery that a particular type of discharge is conducive to more rapid formation of nitrogen pentoxide and hence lower consumption of power, and that the product is $N_2O_5$ (or $HNO_3$ if $H_2O$ is present) rather than any of the other oxides of nitrogen and that there is no appreciable conversion of electrical energy into heat energy. It is to be pointed out that $N_2O_5$ or $HNO_3$ are easier to absorb or collect than the other oxides of nitrogen.

This particular type of discharge is not an arc of high temperature in which a large amount of current passes along a path of ionized air of high conductivity, nor is it a spark of a temperature somewhat only less than that of the arc, accompanied by bright light and loud snapping noise, nor is it a corona which, while relatively of low temperature, is constant and of uniform brightness throughout. Our particular type of discharge is known as a streaming electric-discharge in which there is no appreciable heating of the gases and no sharp report or crackle, but sometimes a whirring noise, in which visible streamers extend out from the electrodes. At first these streamers are accompanied by a uniform light corona, but later this corona disappears and they extend out in a dark field, but disappear or fade out in space.

To obtain the maximum number and length of these streamers the electrical conditions approach the usual conditions under which a spark forms, and to get the highest yields of nitric acid or its anhydrides it is difficult to prevent the formation of occasional sparks. These sparks are not necessary in the process but a few do no harm. Excessive sparking, however, causes waste of energy as heat and decomposition of the $N_2O_5$ with the consequent production of a smaller yield of less desirable oxides of nitrogen.

This particular type of discharge is produced by an electrical current of high voltage and high frequency of oscillations or interruptions, not less than 1000 oscillations or interruptions of the current per second and preferably we employ from 10,000 to 100,000. In our experiments this current was produced by an oscillatory circuit and a Tesla coil but any other means of producing such a current is satisfactory.

In the accompanying drawings illustrating an apparatus suitable for carrying out our invention, Figure 1 is a diagrammatic view of such apparatus, Fig. 2 a detail diagrammatic plan of the face of an electrode, and Fig. 3 is a diagrammatic view of the electrical apparatus and connections.

Referring to the drawings, a main supply circuit or power line is designated at A in which is included the primary of a transformer D, the secondary of which is included in a circuit comprising a variable capacity or condenser B, a variable inductance E, a spark gap C and the primary of a transformer F, the secondary of which transformer is connected through the leads 3 and 3' to the electrodes 2 of a furnace or discharge chamber 1. The gas to be treated such as air, for example, enters through inlet 4 and passes between the electrode thence through outlet 5 to an absorption tower 6 having an outlet 7 for the waste unabsorbed gas.

The electrodes 2 may be of any shape suitable for producing the greatest number of streamers compatible with high efficiency of operation, for example the same may consist of discs, or of coarse wire mesh or spaced brush filaments and the gap between the terminals is adjusted so as to exceed the "sparking distance" of the particular currents passing between the same and so as to produce fade-out or disappearing streamers of the character hereinbefore described.

With proper facilities for cheaply obtaining currents of very high intermittency, the yield of $N_2O_5$, figured as $HNO_3$, produced by the herein described process will not only greatly exceed that produced in any so-called ozonizer but taking into consideration the character of the product at hand will compare favorably with the best yields of $HNO_3$ obtainable in the arc processes especially for certain localities under the special conditions of operation required therein.

By high voltage we refer to voltages exceeding 10,000 and preferably voltages above 75,000 in conjunction with an intermittency of above 75,000 across a distance of several inches and at least substantially in excess of the "sparking distance" under such conditions, in order to obtain the disappearing or fade-out, streaming discharge hereinbefore described.

By the term "a current of high intermittency" we include a very frequently interrupted direct or alternating current and high frequency alternating currents and oscillatory currents.

The presence of ozone, which is a decomposition product of $N_2O_5$, is necessary to hinder the breaking down of such $N_2O_5$ into the lower oxides. Accordingly when $N_2O_5$ is sought after, the temperature of the gases being treated should not exceed that at which substantial decomposition of nitrogen pentoxide occurs under the then existing conditions as influenced by the ozone present and should not in any event exceed 300° C., at which point both ozone and $N_2O_5$ decompose.

On the other hand, if the lower oxides are sought, correspondingly higher temperatures can be employed without liability of decomposition thereof.

Having thus described our invention, what we claim and desire to secure by Letters Patent of the United States is:

1. The process of making an oxygen compound of nitrogen, which consists in subjecting an intimate mixture of oxygen and nitrogen to the action of a discharge between electrodes of opposite polarity in an oscillatory electric circuit having a frequency between 10,000 and 100,000 cycles and a voltage between 10,000 and 100,000 volts, while maintaining a space between said electrodes substantially in excess of the "sparking distance" therebetween under such conditions and sufficient to produce disappearing streamers between said electrodes.

2. The process of making an oxygen compound of nitrogen, which consists in subjecting an intimate mixture of oxygen and nitrogen to the action of a discharge between electrodes of opposite polarity in an oscillatory electric circuit having a frequency of 10,000 cycles and a voltage of 10,000 volts, while maintaining a space between said electrodes substantially in excess of the "sparking distance" therebetween under such conditions and sufficient to produce disappearing streamers between said electrodes.

3. The process of making an oxygen compound of nitrogen, which consists in subjecting an intimate mixture of oxygen and nitrogen to the action of a discharge between electrodes of opposite polarity in an oscillatory electric circuit having a frequency between 75,000 and 100,000 cycles and a voltage between 75,000 and 100,000 volts, while maintaining a space between said electrodes substantially in excess of the "sparking distance" therebetween under such conditions and sufficient to produce disappearing streamers between said electrodes.

4. The process of making an oxygen compound of nitrogen, which consists in subjecting an intimate mixture of oxygen and nitrogen while flowing between a pair of electrodes of opposite polarity to the action of a substantially silent discharge produced by a current of extremely frequent intermittency and a voltage between 10,000 and 100,000 volts.

5. The process of making an oxygen compound of nitrogen, which consists in subjecting an intimate mixture of oxygen and nitrogen while flowing between a pair of electrodes of opposite polarity to the action of a substantially silent discharge produced by a current having an intermittency between 10,000 and 100,000 and a potential between 10,000 and 100,000 volts, the distance between said electrodes being substantially in excess of the "sparking distance" therebetween under such conditions and sufficient to produce disappearing streamers between said electrodes, and the temperature of the gases in the discharge zone being maintained below the point at which substantial decomposition of nitrogen pentoxide occurs under the existing conditions therein.

Signed at Norwich, county of New London, State of Connecticut, this 8th day of May, 1919.

FARRINGTON DANIELS.
OLIVER R. WULF.